(12) United States Patent
Nunez et al.

(10) Patent No.: US 8,235,151 B2
(45) Date of Patent: Aug. 7, 2012

(54) RETURN TO NEUTRAL CONTROL MECHANISM FOR ZERO TURNING RADIUS MOWER

(75) Inventors: Dimitri Nunez, Waxhaw, NC (US); Franklin Patrick Lewis, Fuquay-Varina, NC (US); Damon C. Green, Garner, NC (US); Brad A. Hoffman, Angier, NC (US); John W. Wall, Staley, NC (US); Michael David, Fuquay-Varina, NC (US); Curtis Ayers, Willow Springs, NC (US); Thomas G. Bartlett, Apex, NC (US); William B. Lambeth, Jr., Sanford, NC (US)

(73) Assignee: Deere & Company, Moline, IL (US)

( * ) Notice: Subject to any disclaimer, the term of this patent is extended or adjusted under 35 U.S.C. 154(b) by 366 days.

(21) Appl. No.: 11/838,382

(22) Filed: Aug. 14, 2007

(65) Prior Publication Data
US 2009/0044506 A1    Feb. 19, 2009

(51) Int. Cl.
*A01D 69/10* (2006.01)
(52) U.S. Cl. .......... 180/6.32; 56/10.8; 56/11.2; 56/11.3; 180/6.2; 180/19.3; 180/315
(58) Field of Classification Search .................. 180/6.48, 180/6.32, 333; 54/11.3
See application file for complete search history.

(56) References Cited

U.S. PATENT DOCUMENTS

| | | | | |
|---|---|---|---|---|
| 6,029,761 A | * | 2/2000 | Gustafson et al. | 180/6.2 |
| 6,056,074 A | * | 5/2000 | Heal et al. | 180/6.48 |
| 6,155,033 A | * | 12/2000 | Wians et al. | 56/11.1 |
| 6,301,864 B1 | | 10/2001 | Damie et al. | |
| 6,341,479 B1 | * | 1/2002 | Scag et al. | 56/11.3 |
| 6,434,917 B1 | | 8/2002 | Bartel | |
| 6,564,481 B2 | * | 5/2003 | Wakitani et al. | 37/348 |
| 6,708,805 B2 | * | 3/2004 | Samejima et al. | 192/13 A |
| 6,739,116 B2 | | 5/2004 | Stover et al. | |
| 2004/0050026 A1 | | 3/2004 | Stover et al. | |
| 2005/0044836 A1 | | 3/2005 | Goto et al. | |
| 2006/0081084 A1 | * | 4/2006 | Nishino et al. | 74/473.1 |
| 2007/0039301 A1 | * | 2/2007 | Velke et al. | 56/10.8 |
| 2008/0034721 A1 | * | 2/2008 | Waesche et al. | 56/11.9 |

* cited by examiner

*Primary Examiner* — Lesley D. Morris
*Assistant Examiner* — Jacob Knutson

(57) ABSTRACT

A return to neutral control mechanism for a zero turning radius mower is disclosed. The return to neutral control mechanism includes a pair of control levers pivotable between forward, neutral and reverse positions. A brake pedal is moveable between a disengaged position to an engaged position. In response to engagement of the brake pedal, a control pivot attached to each control lever moves each control lever to the neutral position. The return to neutral control mechanism may include a cam that rotates in response to engagement of the brake pedal, and a control pivot that follows the cam during engagement of the brake pedal.

15 Claims, 5 Drawing Sheets

RETURN TO NEUTRAL CONTROL MECHANISM FOR ZERO TURNING RADIUS MOWER

FIELD OF THE INVENTION

This invention relates to grass mowing machines, and specifically to return to neutral control mechanisms for zero turning radius ("ZTR") mowers having independently powered left and right drive wheels controlled by a pair of control levers or sticks.

BACKGROUND OF THE INVENTION

Grass mowing machines known as zero turning radius ("ZTR") mowers have at least one independently powered drive wheel on each side of a frame. Many ZTR mowers have a twin stick control system. A pair of control levers or sticks may be provided side-by-side, with each lever or stick controlling one of the drive wheels. When both levers or sticks are advanced together forwardly out of their neutral position, both drive wheels rotate forwardly to cause the mower to move forward. A ZTR mower may be steered by advancing one lever or stick more than the other.

Typically, each control lever or stick on a ZTR mower may be linked to a pump arm of one of two separate hydraulic pumps, or of a dual hydraulic pump; i.e., a separate pump for each wheel. The lever or stick may be used to move a pump swash plate through a direct linkage.

The control levers or sticks on a ZTR mower may be mounted on the vehicle frame so that each has a first pivot axis allowing the lever or stick in the operating position to pivot forwardly in an arc to turn the wheel in forward, or pivot rearwardly to turn the wheel in reverse. Additionally, the operator can pivot each lever or stick to a neutral operating position, and then pivot each lever or stick outwardly in an arc to a non-operating or park position.

Some ZTR mowers have start circuits that require the control levers or sticks to be pivoted outward, and also require engagement of a parking brake. Other ZTR mowers activate the parking brake on each drive wheel by moving the steering levers outward. For example, U.S. Pat. No. 6,434,917 relates to a ZTR mower with combined steering and brake levers in which the levers are each connected through a first series of linkages to the hydraulic pump control, and through second linkages which lock the brake on each wheel. Before the engine can be started, a micro switch must be closed and the parking brakes must be set by pivoting both levers out.

Additionally, U.S. Pat. No. 6,739,116 relates to a powered actuator system for a ZTR mower parking brake system. The powered actuator system automatically engages the parking brakes when the operator places the control sticks into their laterally pivoted, outboard positions. The powered actuator system includes electrical sensors or switches that detect if the control sticks are placed in their outboard positions. The electrical sensors or switches are connected by a circuit having a solenoid that is energized or deenergized to engage or disengage the parking brake system.

However, due to wear, slop in the system, and contamination, electrical sensors, switches or electromechanical devices used in return to neutral control mechanisms sometimes have failed to recognize if the control levers or sticks are in their outboard positions. As a result, the ZTR mower will not start or the parking brake cannot be used. Additionally, some ZTR mower operators may wish to apply the parking brake, or start the engine, without pivoting both control levers or sticks to their outboard positions.

To overcome these problems, a return to neutral control mechanism for a ZTR mower is needed that is not subject to wear, slop in the system, or contamination, and that will help ensure the mower can be started if the parking brake is engaged. A return to neutral control mechanism for a ZTR mower is needed that will eliminate electrical switches or sensors that apply the parking brakes if the control levers or sticks are at the neutral position. A return to neutral control mechanism for a ZTR mower is needed that allows the parking brake to be locked if the control levers or sticks are at their outboard or inboard positions.

SUMMARY OF THE INVENTION

A return to neutral control mechanism for a zero turning radius mower moves a pair of control levers to the neutral position upon engagement of the brake pedal. The return to neutral control mechanism includes a linkage between the brake pedal and a shaft, and between the brake pedal and a pair of wheel brakes. A pair of cams on the shaft contact control pivots on each control lever as the shaft rotates and the wheel brake is engaged.

The return to neutral control mechanism is not subject to wear, slop in the system, or contamination, and helps ensure the mower can be started if the parking brake is engaged. The return to neutral control mechanism eliminates electrical switches or sensors that apply parking brakes if the control levers or sticks are at the neutral position. The return to neutral control mechanism allows the parking brake to be locked if the control levers or sticks are at their outboard or inboard positions.

DESCRIPTION OF THE PREFERRED EMBODIMENT

Figure 1:
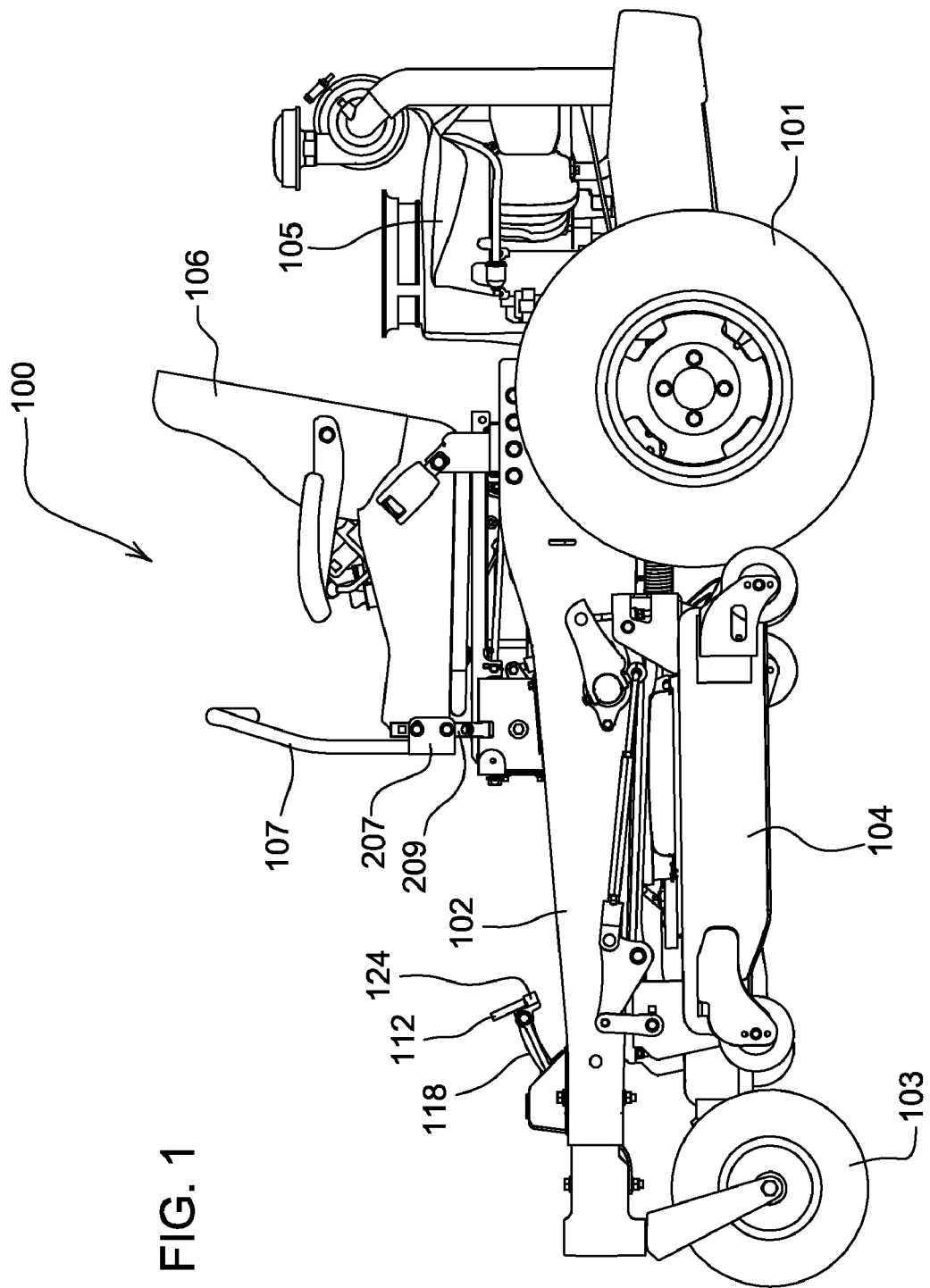
FIG. 1 is a side view of a ZTR mower having a return to neutral control mechanism according to a first embodiment of the invention.

The return to neutral control mechanism of the present invention may be used with zero turning radius ("ZTR") mower 100 shown in FIG. 1, having at least one drive wheel 101 on each side that is independently powered to rotate independently of the other drive wheel. Each independent drive may include a separate hydrostatic drive motor coupled to each wheel. The pair of drive motors may be connected via hydraulic conduits to a dual hydrostatic pump; i.e., a separate pump for each wheel. Each side of the dual hydrostatic pump may have a swash plate that may define a pump stroke between a neutral position and a full forward position. The ZTR mower may have a frame 102 supported on a forward end by front wheels 103, and suspending a mower deck 104 between the front and rear wheels. The ZTR mower may have a rear-mounted engine 105 behind an operator seat 106. The seat may be mounted over the frame for a seated operator to use left and right control levers or sticks 107, 108, as shown in FIG. 2.

Figure 2:
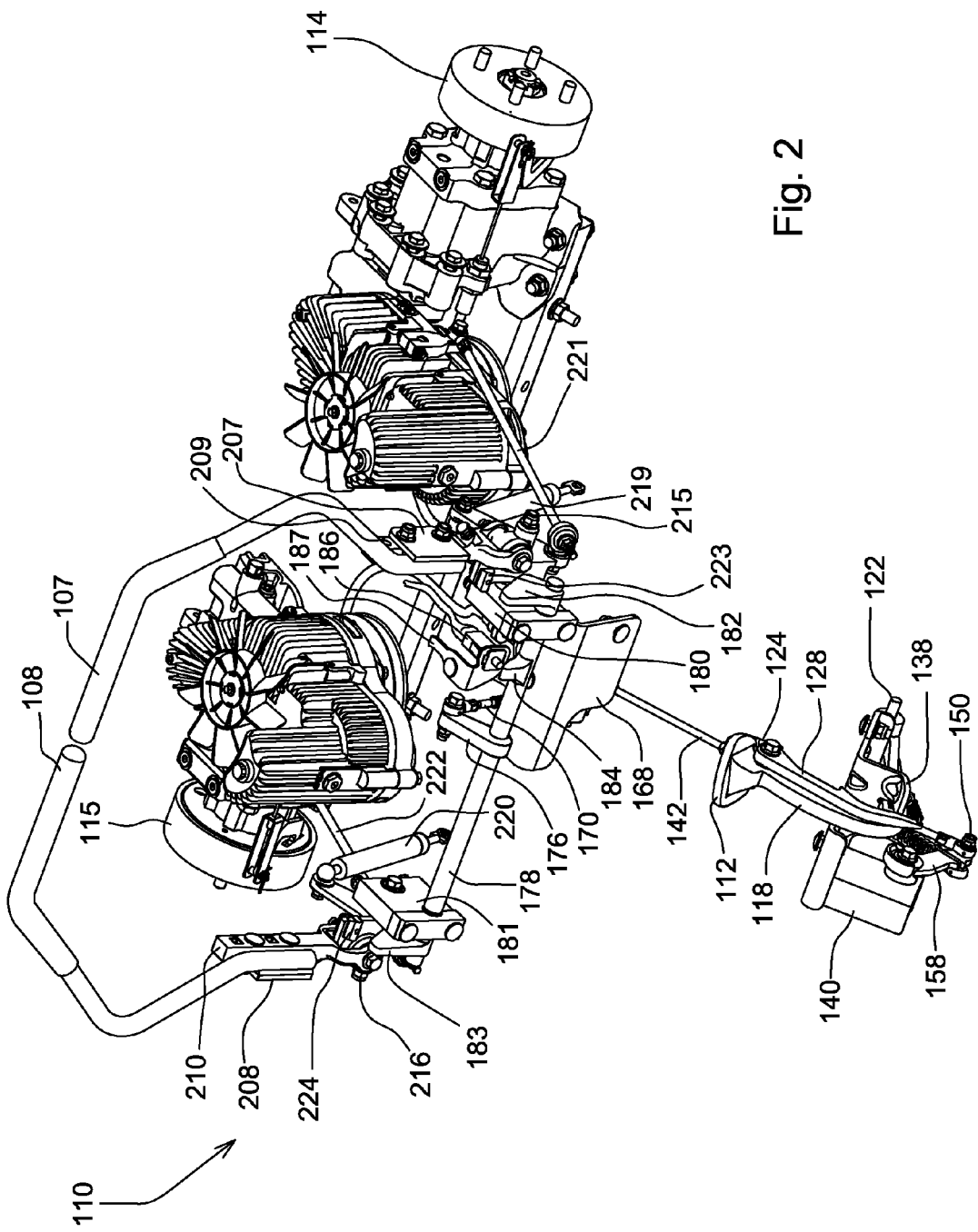
FIG. 2 is a front perspective view of a return to neutral control mechanism for a ZTR mower according to a first embodiment.

Still referring to FIG. 2, a pair of control levers 107, 108 are mounted on the zero turning radius mower and are pivotable between forward, neutral and reverse positions. Each control lever or stick 107, 108 may be mounted to the ZTR mower so that the lever may pivot forwardly to move a swash plate in a hydrostatic pump in a first direction to cause a drive wheel to rotate forward, or pivot rearwardly to move the swash plate in a second direction to cause the drive wheel to rotate backward. Each control lever or stick may have a neutral position in which the corresponding drive wheel is at rest. The pair of control levers or sticks may be mounted adjacent or in front of operator's seat 106 on a ZTR mower.

As shown in FIG. 2, in one embodiment, return to neutral control mechanism 110 may be operated with a brake actuator such as brake pedal 112, or a hand lever that may be manually operated by a seated operator. Depressing brake pedal 112 engages left and right rear wheel brakes 114, 115, and also urges left and right control levers or sticks 107, 108 to the neutral position. As a result, the operator may be assured that both control levers are in the neutral position while the park brake is engaged. While the park brake is engaged and the control levers are at the neutral position, the control levers may be pivoted outwardly to improve access to or from the operator's seat 106. The control levers may be at their inboard positions, or pivoted between their inboard and outboard positions.

Figure 3:
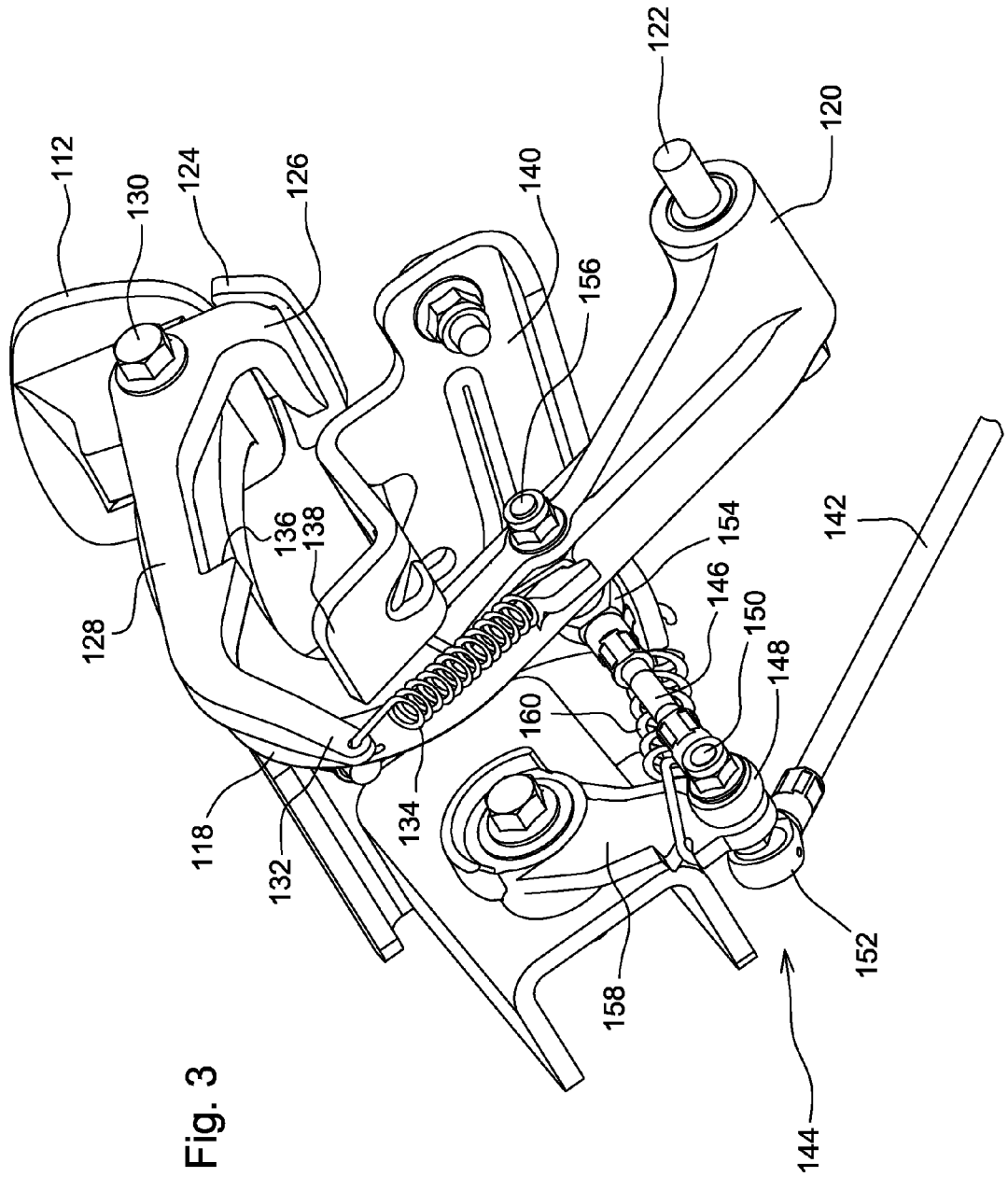
FIG. 3 is a front perspective view of a parking brake pedal of the return to neutral control mechanism in the first embodiment.

Now referring to FIG. 3, in one embodiment, brake pedal 112 is moveable between a disengaged position and an engaged position. Brake pedal 112 may be at a first or upper end of generally U-shaped neck 118. The second or lower end 120 of neck 118 may be pivotably mounted to mower frame 102 at brake pedal pivot axis 122.

In one embodiment, as shown in FIG. 3, brake pedal 112 may be latched in the engaged position using latch activation pedal 124. Latch activation pedal 124 may be provided adjacent brake pedal 112, where it may be depressed by the operator's heel. Latch activation pedal 124 may be at the first or upper end 126 of latch lever 128, which may be pivotably attached to the neck of the brake pedal at latch pivot axis 130. Second or lower end 132 of latch lever 128 may be attached to neck 118 by spring 134. Latch lever 128 may have a shoulder 136 between its first and second ends 126, 132. If brake pedal 112 is depressed sufficiently to fully engage the brakes, the shoulder 136 of latch lever 128 engages catch 138 on bracket 140 mounted to mower frame 102. Once the latch pedal is depressed, spring 134 helps hold and maintain latch lever 128 in the latched position, and brake pedal 112 in the engaged position. To disengage the brake pedal and the latch lever, the operator may depress latch activation pedal 124 sufficiently to overcome the bias force of spring 134 and disengage shoulder 136 from catch 138.

In one embodiment, return to neutral control mechanism 110 provides a linkage between brake pedal 112 and RTN cams 182, 183. By depressing the brake pedal to engage the brakes, RTN cams 182, 183 urge control levers 107, 108 to the neutral position. The linkage may include brake/RTN rod 142. Depressing brake pedal 112 urges brake/RTN rod 142 axially forward. The linkage also may include force multiplier 144 connecting brake pedal 112 to brake/RTN rod 142. The force multiplier may include force multiplier rod 146 having a first end 148 pivotably attached to first pivot axis 150 at the first end 152 of brake/RTN rod 142, and a second end 154 attached to second pivot axis 156 on the neck 118 of brake pedal 112. Additionally, force multiplier 144 may include bell crank 158 pivotably connected between first pivot axis 150 and bracket 140, and spring 160 between the bell crank and bracket. As brake pedal 112 is depressed, the angle between brake/RTN rod 142 and force multiplier rod 146 decreases, and the angle approaches zero when the brake pedal is fully engaged. As a result, the force multiplier provides sufficiently high axial force on the brake/RTN rod from depressing the brake pedal.

Figure 4:
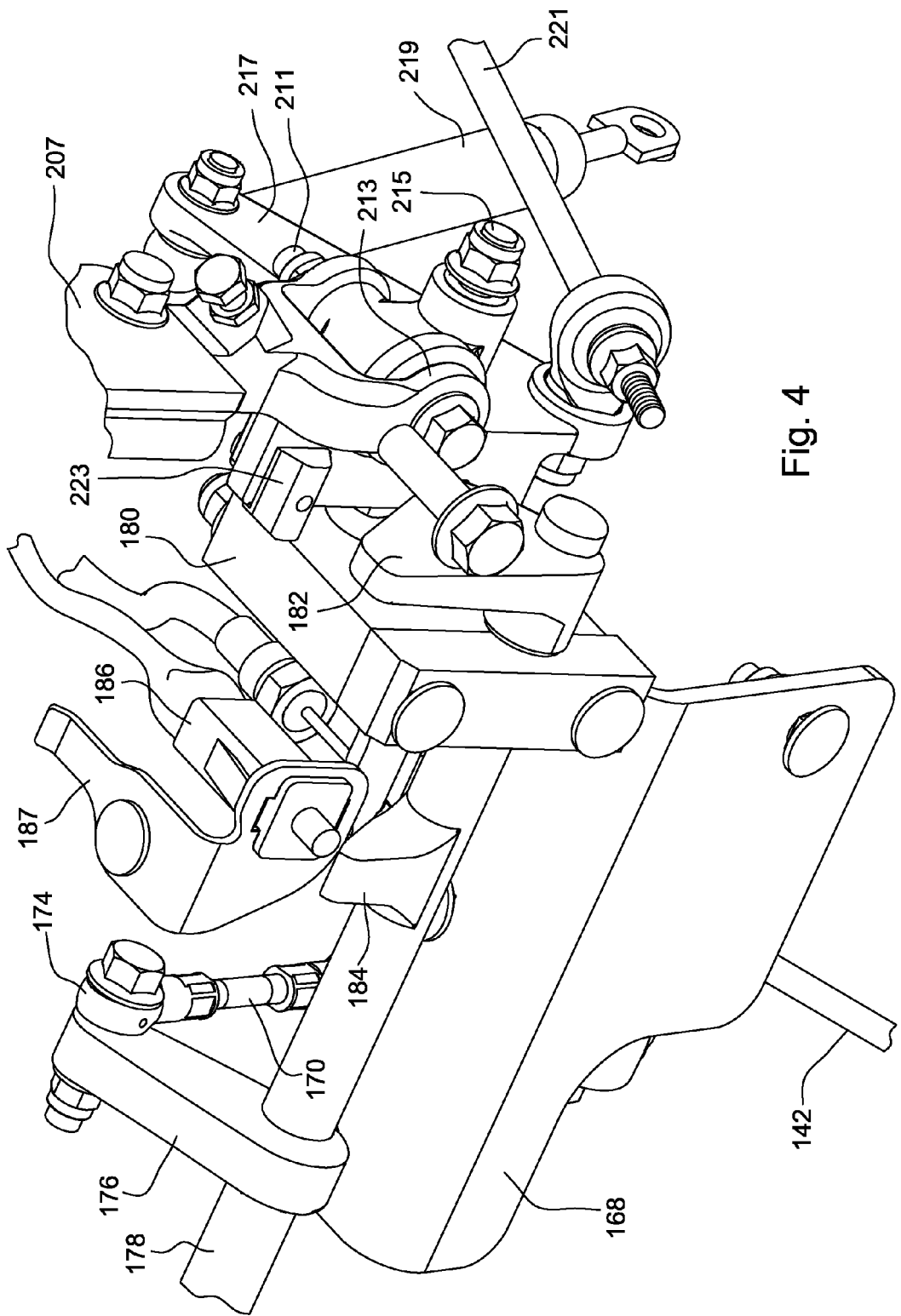
FIG. 4 is a top front perspective view of a portion of a return to neutral control mechanism including an RTN cam, according to a first embodiment.
Figure 5:
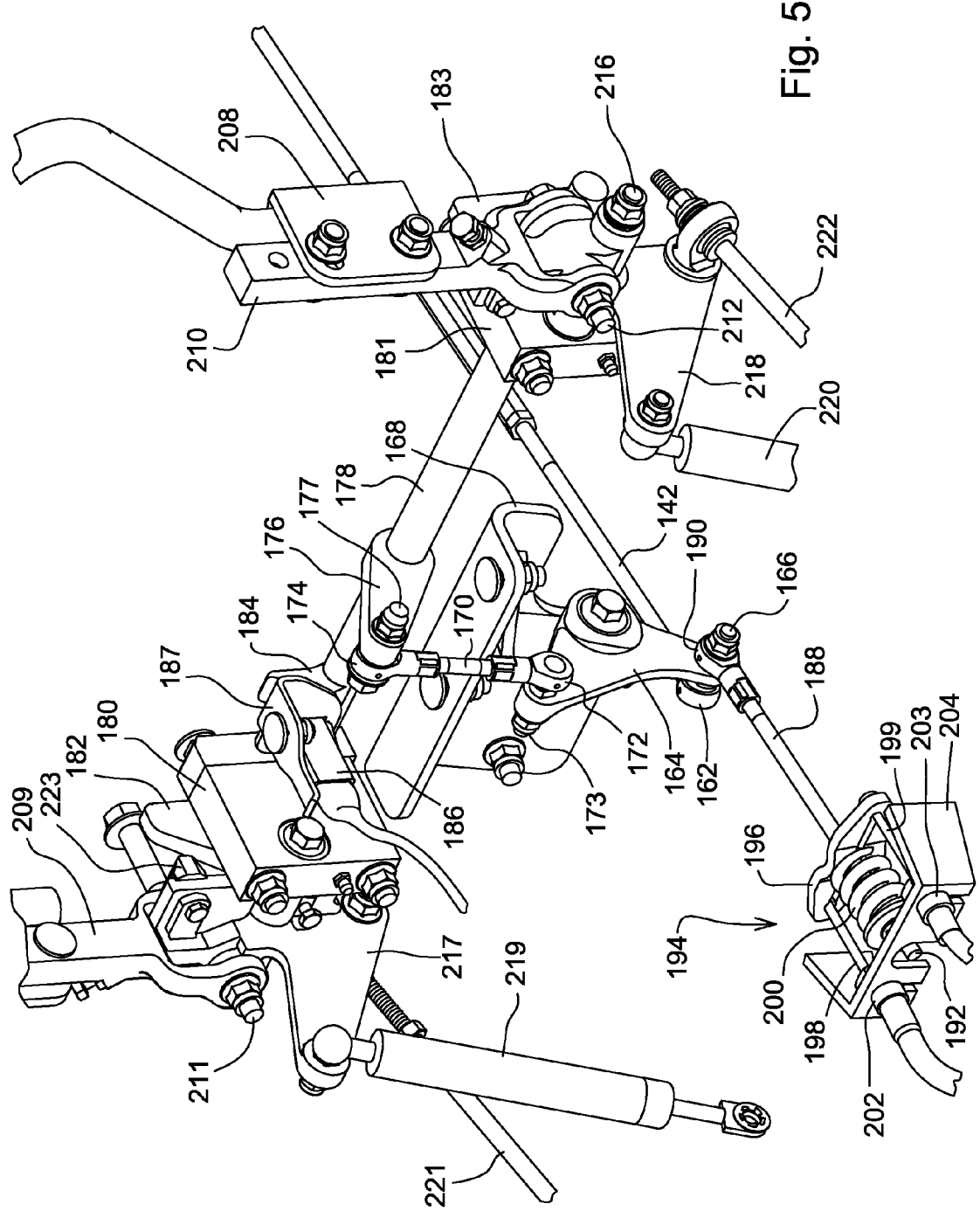
FIG. 5 is a rear perspective view of a return to neutral control mechanism for a ZTR mower in a first embodiment.

Now referring to FIGS. 4 and 5, in one embodiment, the linkage between the brake pedal and the RTN cams also may include RTN shaft 178 that turns on its axis as the brake pedal is engaged. Brake/RTN rod 142 extends rearwardly and has a second end 162 pivotably connected to RTN bell crank 164 at pivot axis 166. RTN bell crank 164 is pivotably mounted to bracket 168 attached to mower frame 102. RTN rod 170 has first end 172 pivotably attached to RTN bell crank 164 at pivot axis 173, and second end 174 attached to RTN shaft crank 176 at pivot axis 177. As brake pedal 112 is depressed to pull brake/RTN rod 142 axially forward, RTN bell crank 164 pivots and moves RTN rod 170 downwardly. As a result, RTN shaft 178, which extends laterally and is supported by bearing blocks 180, 181, turns on its axis.

In the embodiment shown in FIGS. 4 and 5, RTN cams 182, 183 are mounted in fixed positions on each end of RTN shaft 178. Each cam has a profile configured to urge a control lever 107, 108 to the neutral position if brake pedal 112 is depressed. If the brake pedal is not depressed, RTN cams 182, 183 do not interfere with and are not affected by movement of the control levers. The RTN shaft, RTN shaft crank and RTN cams may be constructed as a one piece casting. Additionally, brake indicator tab 184 may be mounted to RTN shaft 178. Turning RTN shaft 178 may urge brake indicator tab 184 into actuating contact with brake indicator switch 186 mounted on bracket 187 adjacent the tab. The brake indicator switch may be connected to an engine starting circuit that requires brake engagement.

As shown in FIG. 5, in one embodiment, return to neutral control mechanism 110 also may connect brake pedal 112 to the left and right wheel brakes. For example, the linkage may include brake rod 188 having a first end 190 pivotably connected to RTN bell crank 164, and a second end 192 connected to brake actuation assembly 194. The brake actuation assembly may include a pair of cables that are pulled to engage left wheel brake 114 and right wheel brake 115 equally and essentially simultaneously. The brake actuation assembly also may allow over travel of brake pedal 112, brake/RTN rod 142 and brake rod 188 after the left and right wheel brakes have fully engaged. Brake actuation assembly 194 may include plate 196 to which the left and right wheel brake cables 198, 199 are attached, and spring 200 which allows continued axial movement of brake rod 188 after full engagement of the brakes. The brake cables may extend through sleeves 202, 203 mounted to bracket 204.

In an alternative embodiment of the return to neutral control mechanism, the linkage between the brake pedal and the RTN cams may include a cable. For example, a cable may be provided between the brake pedal and RTN shaft. Depressing the brake pedal pulls the cable to turn the RTN shaft.

In one embodiment, as shown in FIGS. 4 and 5, the lower end of each control lever or stick 107, 108 may be mounted so that each lever or stick can move independently of the other. Each control lever or stick may be fastened with bolts through bracket or plate 207, 208 to neutral position lever 209, 210 at its second or lower end. The neutral position levers 209, 210 may each pivot inwardly and outwardly on a first axis defined by shaft or threaded fastener 211, 212. The neutral position levers may be fastened at their lower ends to control pivots 217, 218, each of which can pivot on a second axis defined by a transverse shaft or threaded fastener 215, 216. Control pivots 217, 218 allow each control lever 107, 108 to move between a forward position and a reverse position. Dampers 219, 220 and steering linkages 221, 222 each may be separately fastened to control pivots 217, 218 as will be explained below. Steering links 221, 222 may be rods that move axially in response to forward or reverse pivoting of a control lever to which it is connected, to move the swash plates in the left and right wheel hydraulic motors.

In one embodiment, control pivots 217, 218 at the lower ends of each control lever 107, 108 are cam followers that, in response to engagement of the brake pedal and rotation of RTN cams 182, 183, force the control levers to pivot to the neutral position. Optionally, pads 223, 224 may be attached to each of the control pivots 217, 218 where the control pivots contact RTN cams 182, 183. The pads provide a reduced friction surface that helps RTN cams 182, 183 urge the control pivots 217, 218 into the neutral position when the park brake is applied. As a result, applying park brake 112 urges both control levers 107, 108 to their neutral positions. While the park brake remains locked with the latch activation pedal 124, the control levers remain locked in their neutral positions.

Having described the preferred embodiment, it will become apparent that various modifications can be made without departing from the scope of the invention as defined in the accompanying claims.

The invention claimed is:

1. A return to neutral control mechanism for a zero turning radius mower, comprising:
    a left control lever and a right control lever mounted on the zero turning radius mower, each control lever independently pivotable between forward, neutral and reverse positions to control a hydrostatic pump, each hydrostatic pump connected by hydraulic conduits to a separate hydrostatic motor so that each control lever independently rotates a separate drive wheel in forward, neutral or reverse;
    a brake pedal moveable between a disengaged position to an engaged position;
    the brake pedal linked to a return to neutral shaft having an axis extending laterally across the mower and a pair of cams fixedly mounted to the shaft,
    a control pivot attached to each control lever, each control pivot sliding on one of the cams;
    movement of the brake pedal toward its engaged position urges the return to neutral shaft to rotate on its axis so that the control pivots sliding on the cams move the left and the right control levers from their forward or reverse positions toward their neutral positions.

2. The return to neutral control mechanism of claim 1 wherein each control lever is pivotable inward and outward while the brake pedal is engaged and while the control levers are in the neutral position.

3. The return to neutral control mechanism of claim 1 further comprising a latch to hold the brake pedal in the engaged position.

4. A return to neutral control mechanism for a zero turning radius mower, comprising:
    a left control lever and a right control lever mounted on the zero turning radius mower;
    a left control pivot and a right control pivot attached to the left and the right control levers respectively, each control pivot being pivotable on a first axis between a forward, neutral and reverse position to independently operate a separate hydrostatic pump in forward, neutral or reverse; and
    a brake actuator that is moveable to an engaged position to engage a wheel brake and rotate a return to neutral shaft on a transverse axis of the return to neutral shaft, and having a pair of cams mounted thereto, the left and the right control pivots sliding on the cams to urge each control pivot to pivot to their neutral position and operate both of the hydrostatic pumps in neutral when the brake actuator is moved to the engaged position.

5. The return to neutral control mechanism of claim 4 wherein the brake actuator is a brake pedal.

6. The return to neutral control mechanism of claim 4 further comprising a rod connecting the brake actuator to a crank on the shaft.

7. The return to neutral control mechanism of claim 4 further comprising a cable connecting the brake actuator to the wheel brake.

8. The return to neutral control mechanism of claim 4 wherein the control levers in the neutral position are pivotable on a second axis between an inboard position and an outboard position after the brake is engaged.

9. The return to neutral control mechanism of claim 4 further comprising a force multiplier between the brake actuator and the shaft.

10. The return to neutral control mechanism of claim 4 further comprising a brake indicator tab on the shaft to actuate a brake indicator switch.

11. A return to neutral control mechanism for a zero turning radius mower, comprising:
    a first rod having a first end connected to a brake pedal and a second end connected to a crank; the brake pedal movable between disengaged and engaged positions;
    a brake actuation assembly connected to the crank and applying a pair of wheel brakes if the brake pedal moves to the engaged position;
    a shaft connected to the crank with a pair of cams fixedly mounted to the shaft, and a pair of low friction cam followers on a left control lever and a control lever, each control lever independently pivotable between a forward position to rotate one of a left wheel and a right wheel in forward, a neutral position that does not rotate the wheel, and a reverse position to rotate the wheel in reverse, the shaft having an axis and rotating on the axis to urge the pair of control levers to the neutral position in response to moving the brake pedal to the engaged position.

12. The return to neutral control mechanism of claim 11 further comprising a brake pedal latch adjacent the brake pedal that holds the brake pedal in the engaged position.

13. The return to neutral control mechanism of claim 11 wherein the brake actuation assembly further comprises a lost motion mechanism.

14. The return to neutral control mechanism of claim 11 wherein the control levers are pivotable inwardly and outwardly only if the brake pedal is engaged.

15. The return to neutral control mechanism of claim 11 further comprising a switch actuated by turning the shaft, the switch connected to an engine starting circuit such that actuation of the switch is required to start the mower.

* * * * *